May 27, 1952     C. H. GERLACH     2,597,861
SUPPORTING AND PROJECTING MECHANISM
Filed July 12, 1948
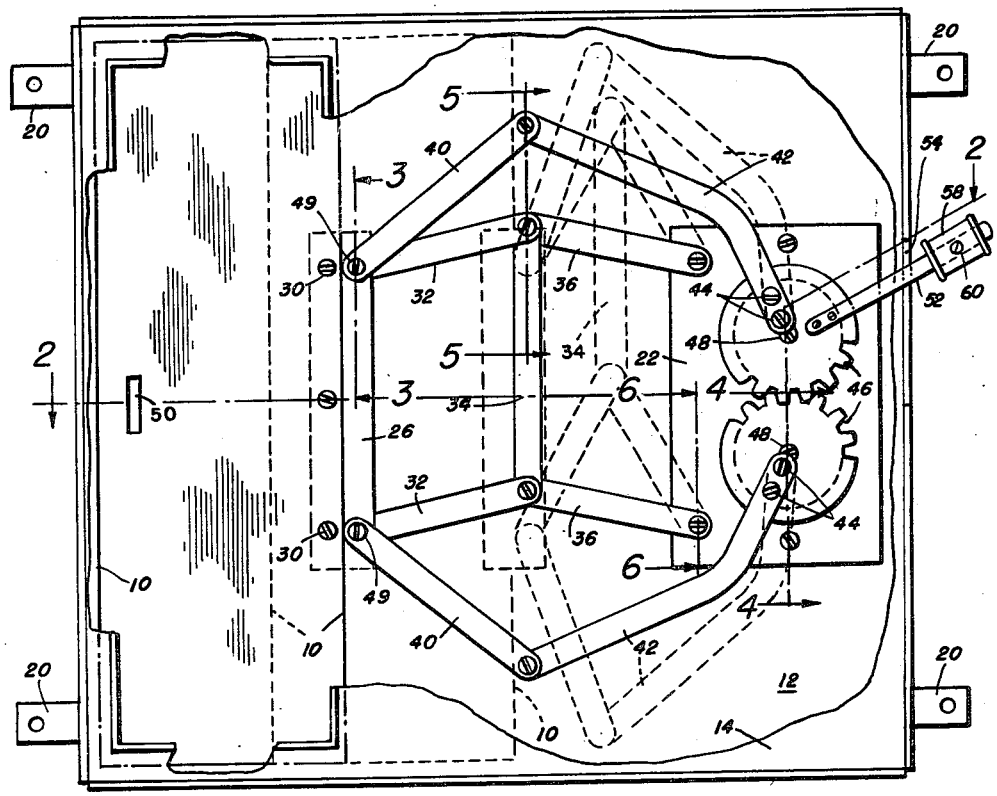
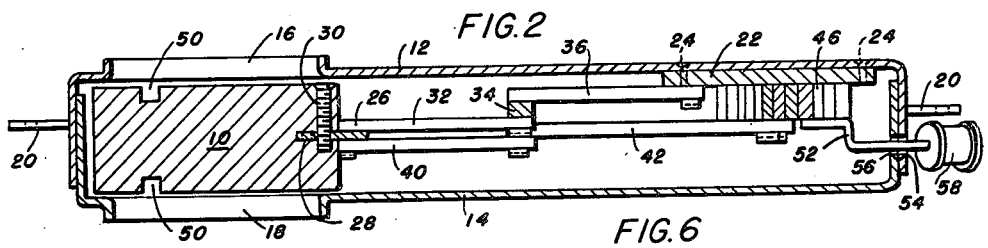
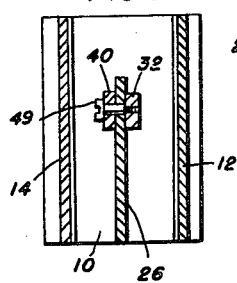 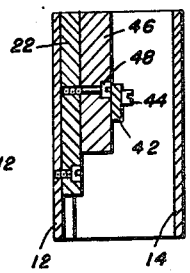 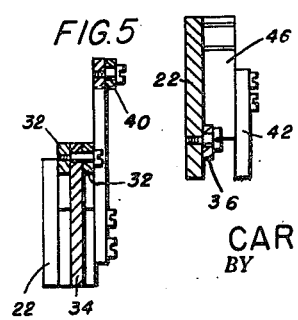
INVENTOR:
CARL H. GERLACH
BY
*M. C. Hayes*
ATT'Y Patented May 27, 1952

2,597,861

UNITED STATES PATENT OFFICE 2,597,861

SUPPORTING AND PROJECTING MECHANISM

Carl H. Gerlach, Solon, Ohio

Application July 12, 1948, Serial No. 38,197

4 Claims. (Cl. 268—55)

(Granted under the act of March 3, 1883, as amended April 30, 1928; 370 O. G. 757)

This invention relates in general to a mechanism for supporting an object and projecting it in a straight line or plane without other guides, runners, or other contacting supports. It may be applied to doors, drawers, windows, signs, machine elements, and other movable parts, and is here more particularly described in connection with a closure for a vertical opening like a door.

An important object of the invention is to provide means for supporting and projecting an object in a straight line, within the limits of reasonable mechanical construction, and without other contacting guides or support.

A further object of the invention is to provide means for mounting doors, windows, drawers, and other parts for controlled rectilinear movement without guides or runners and the resulting friction or jamming therein.

Other objects of the invention will appear in the specification and will be apparent from the accompanying drawings, in which:

Fig. 1 is a view, in parts of an enclosing casing broken away, of a door-like type of closure to which this invention is applied;

Fig. 2 is a sectional view taken on the line 2—2 of Fig. 1;

Figs. 3 and 4 are detail sections taken on the lines 3—3 and 4—4, respectively of Fig. 1, including the casing; and Figs. 5 and 6 are detail sections taken on the lines 5—5 and 6—6 of Fig. 1.

In this invention, a movable member has a fixed support to which it is connected by linkages only and without other rolling or frictional guides, for projecting the member relative to the support, and maintaining it in alignment and in a straight line of movement within the limits of perfection of its mechanical construction, without play or lost motion.

Referring now more particularly to the drawings, a panel or door 10 is represented as movably mounted in enclosing casing parts 12 and 14 having opposite openings 16 and 18 respectively closed by the door, and operating mechanism for supporting and moving the door. The casing parts may fit one within the other and be secured together by spot welding, or in any other suitable manner. One of the parts is provided with outwardly projecting perforated lugs 20 by which the casing may be secured in an opening or in any other location.

A mounting plate 22 is secured to the inside of one of the casing parts 12 by fastening screws 24, and a supporting plate 26 is secured to the door 10, parallel to the plate 22, preferably by inserting the supporting plate partially in a recess 28 at the edge of the door, securing it firmly therein by fastening screws 30 inserted through the edge of the door and the inserted edge of plate 26 and leaving an outer edge of the plate projecting from the edge of the door.

Between the mounting plate 22 and the door plate 26 are two movable and supporting assemblies: one comprises a pair of links 32 of equal length, each pivoted at one end of the door plate 26 at a spaced distance apart, and each pivoted at its other end to a connector 34. Each of a pair of links 36, of equal length, is pivoted at one end to the mounting plate 22 and at the other end to the common connector 34. This assembly constitutes a double parallelogram and is operative to support the door 10 in parallel relation to the plate 22 and is movable to project the door more or less from the plate 22 and to cover or uncover the door openings 16 and 18, moving the door in a straight line, and without sagging or material side-sway, depending upon the accuracy of the mechanical pivoting connections.

The other assembly comprises a pair of toggle joints, each having a bar 40 pivoted at one end to the door plate 26 and pivoted at the other end to the extremity of an arm 42 the other end of which is affixed by screws 44 to a gear 46 rotatably mounted by a shoulder screw 48 on the mounting plate 22. The gears 46 for the two toggle joints mesh closely with each other to operate the joints oppositely in unison and without lost motion.

For convenience in construction and assembly, the links 32 are located on one side of the door plate 26 and the bars 40 are at the other side of the plate, corresponding links and bars being pivoted to the plate by a common shoulder screw 49. This arrangement also clears the parts of the two assemblies from contact or engagement with each other in their movements.

This mechanism is nearly balanced requiring only a slight force to move the door in either direction. A projection or a recess 50 may be provided in each side of the door for moving it, and a weighted operating lever 52 may be secured to one of the gears 46, extending through registering slots 54 and 56 in the casings 12 and 14, and having a weight 58 adjustably secured to the lever by a set screw 60, the weight being in the form of a hand grip for manually moving the lever. The weight may be adjusted or a spring connected to the door or the connected mechanism, tending to keep the door in open or closed position.

For a greater movement of the door or an element corresponding thereto, a series of the two assemblies may be connected to intermediate parts corresponding to the plate 26; for large parts, multiples of the two assemblies may be connected in parallel; and for greater accuracy of straight line movement, two different sets of the two assemblies may be connected at right angles to each other between the supporting and mounting plates, preferably at spaced distances apart.

With this construction and arrangement, a variety of uses and applications of the mechanism are possible wherever a controlled straight line movement of a movable part relative to a fixed support is desired. The movable part has no frictional or rolling guide contacts, and the mechanism is nearly balanced so that the movable part may be easily moved in either direction, or it may have a weight or spring tending to keep it at either limit of movement.

Although a particular construction has been described in detail, it should be regarded as an example or illustration and not as a restriction or limitation of the invention.

The invention described herein may be manufactured and used by or for the Government of the United States of America for governmental purposes without the payment of any royalties thereon or therefor.

I claim:

1. In a panel supporting and projecting mechanism, a fixed support, a double parallelogram linkage having one member in common and connected in series between the support and the panel, a pair of toggle joints each having two connected links, the outer end of one link pivoted to the panel and the outer end of the other link pivoted to the support, and interengaging gears connected to the ends of the links pivoted to the support to move the toggle joints in unison in extending and retracting the said linkage for moving the panel.

2. A structure in accordance with claim 1 in which a hand lever is attached to one of the gears for oppositely rotating the gears and correspondingly actuating the toggle joints and said linkage.

3. A structure in accordance with claim 2 in combination with an enclosing casing in which it is mounted, the casing having an opening closed by the panel in one position thereof, and the casing having a slot through which the hand lever projects by which the panel may be moved to open and close the said casing opening.

4. A structure in accordance with claim 3 in which the portion of the lever projecting from the casing is provided with a weight adjustable thereon from the outside of the casing counter-balancing the panel operating mechanism.

CARL H. GERLACH.

REFERENCES CITED

The following references are of record in the file of this patent:

UNITED STATES PATENTS

| Number | Name | Date |
|---|---|---|
| 652,394 | Lagus | June 26, 1900 |
| 1,570,011 | Serste | Jan. 19, 1926 |
| 1,747,587 | Ledwinka | Feb. 18, 1930 |

FOREIGN PATENTS

| Number | Country | Date |
|---|---|---|
| 28,688 | Norway | Mar. 25, 1918 |
| 98,946 | Germany | Aug. 30, 1898 |